May 8, 1962  C. A. BYERS  3,033,326
IMPROVEMENT IN FRICTION MATERIAL FOR A BRAKE
Filed April 6, 1959  3 Sheets-Sheet 1

INVENTOR.
CLIFTON A. BYERS

BY
ATTORNEY

May 8, 1962 C. A. BYERS 3,033,326
IMPROVEMENT IN FRICTION MATERIAL FOR A BRAKE
Filed April 6, 1959 3 Sheets-Sheet 2

INVENTOR.
CLIFTON A. BYERS
BY
Richard H. MacCutcheon
ATTORNEY

INVENTOR.
CLIFTON A. BYERS
BY
Richard H. MacCutcheon
ATTORNEY

United States Patent Office 3,033,326
Patented May 8, 1962

3,033,326
IMPROVEMENT IN FRICTION MATERIAL
FOR A BRAKE
Clifton A. Byers, Cuyahoga Falls, Ohio, assignor to The
S. K. Wellman Company, Bedford, Ohio, a corporation
of Ohio
Filed Apr. 6, 1959, Ser. No. 804,267
2 Claims. (Cl. 188—251)

This invention relates to friction articles such as elements especially useful in the construction of brakes for aircraft.

In the construction of brakes as for an airplane where the plane lands at very high speeds and great amounts of energy must be absorbed within a short interval of time, great difficulty has been experienced in finding suitable brake elements.

Friction material used for linings or facings in aircraft brakes must be selected and compounded with many factors in mind if customer acceptance and satisfactory operation are to be assured. These factors include (1) ability to meet specifications as to so many normal energy stops, so many high energy stops, or one "panic" stop, (2) low wear of the lining and the surface which it engages, (3) high coefficient of friction at high speed and requisite absence of "fading," (4) low "torque peaking," (5) quietness of operation of the material, (6) freedom from "grabbing" or chatter or other erratic operation. When the brakes are relatively cold (e.g., during airplane taxiing), a difficulty has heretofore been encountered in grabbiness or high coefficient of friction (high torque operation for a given pedal pressure) at such low speed operation of friction material already selected because best for the requisite high speed, high energy stops. Expressed in another way, when a pedal point is provided so that brake pressure will be high enough for a high speed panic stop, putting the pedal at the same place when the brakes are applied at low speed has heretofore tended to tear the landing rigging right off the airplane.

It is an object of the present invention to provide simple and inexpensive means for overcoming the above mentioned difficulty.

Another object of the invention is to provide a brake element coating which will provide a good friction surface for engaging a co-operating brake element, and which will remain in place on the brake element during use for stops from a high speed of relative rotation and which will also minimize sensitivity and grab when stopping from a low speed of relative rotation.

Other objects, and advantages, will become apparent and the invention may be better understood from consideration of the following description taken in connection with the accompanying drawing, in which.

In broad aspect the present invention comprises sintered predominately metallic friction material which is black oxide coated. While such friction material could be applied to either rotatable or stationary members (or to both), in the illustrated embodiment it is assumed the sintered material is applied as layers on opposite sides of only the rotatable discs.

Figure 1:
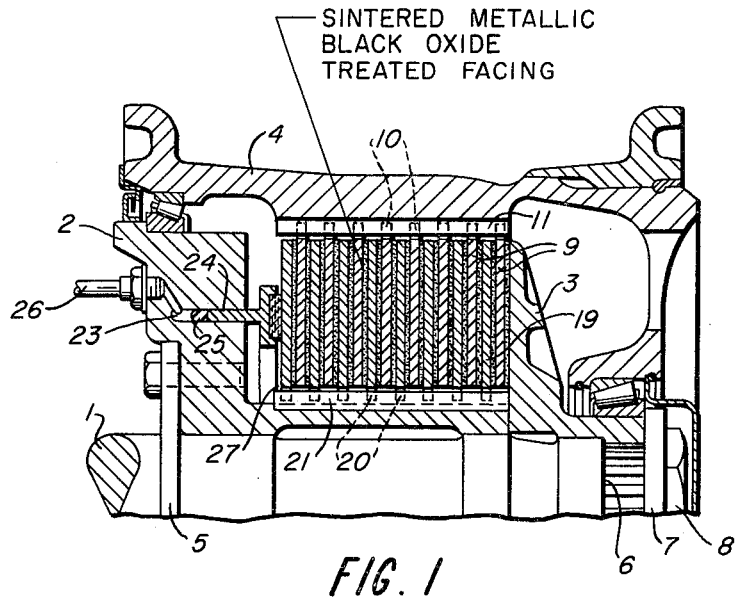
FIG. 1 is an axial cross-sectional view of a brake illustrated as one example of the type of brake to which the present invention is applicable.

Referring to the drawings, FIG. 1 shows a multiple disc brake having a nonrotatable shaft 1 upon which are secured against rotation fixed members 2 and 3 with a brake member 4 rotatable thereabout and carrying rotating discs 9. The shaft 1 is formed with a shoulder 5 against which the fixed member 2 is seated and a second shoulder 6 against which the other fixed member is seated and held by a collar 7 and nut 8 threaded on the shaft. Shoulders 5 and 6 hold the fixed members in axially spaced apart relation.

Figure 2:
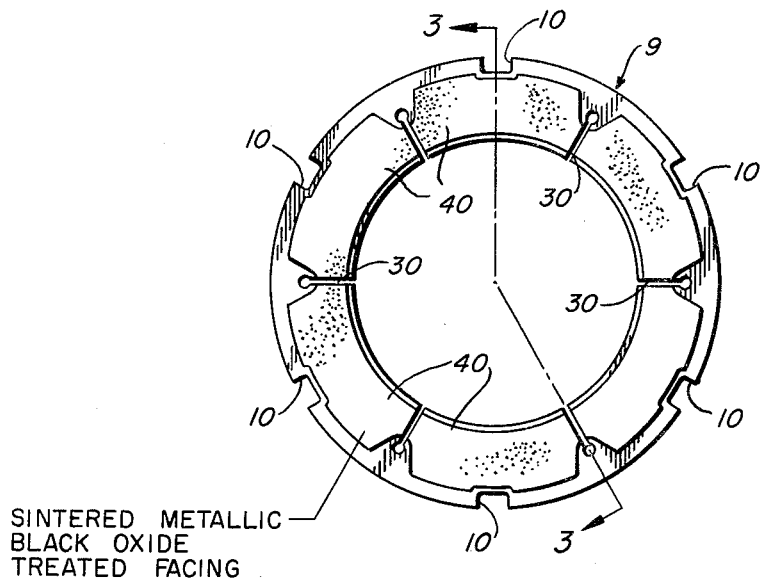
FIG. 2 is a face view of one of the rotatable brake discs.
Figure 3:
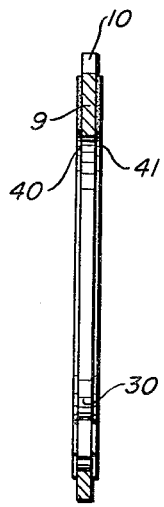
FIG. 3 is a sectional view thereof, taken on line 3—3 of FIG. 2.

For rotating the discs 9 (see FIG. 2) the discs are formed with keyways 10 about their outer peripheries to engage keys 11 secured to the rotatable brake member 4. The keys permit the discs 4 to float axially of the brake.

Figure 4:
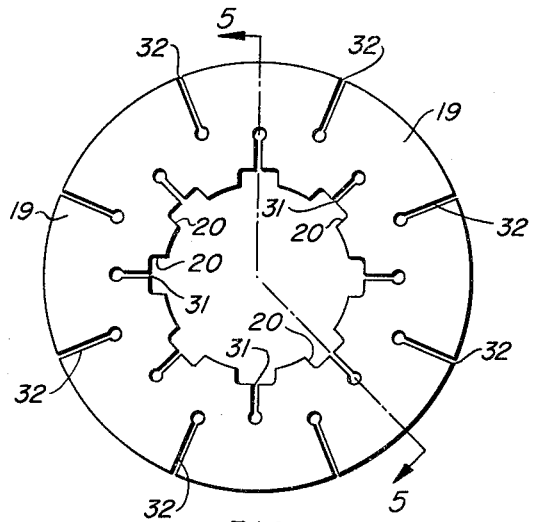
FIG. 4 is a face view of one of the co-operating stationary brake discs.
Figure 5:
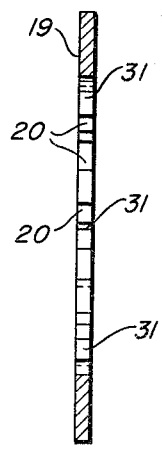
FIG. 5 is a sectional view thereof taken on line 5—5 of FIG. 4.

Between fixed members 2 and 3 are a plurality of stationary brake discs 19 (see FIG. 4) which may be of steel and these are arranged in interspersed relation with the rotating brake discs 9 carried by the rotating brake member 4. For retaining discs 19 against rotation, they are each formed with a plurality of keyways 20 for engaging a plurality of keys 21 on the member 2. The keys may be serrations integral with the member 2 or integral with the shaft and the discs 19 are free to float axially of the shaft.

For applying braking pressure, a cylinder in the form of an axially directed annular groove 23 is provided in the fixed brake member 2 and an annular piston 24 is mounted therein for axial movement, a sealing ring 25 being provided to seal the joint. A pipe 26 provides fluid under pressure to the cylinder to force the annular piston 24 toward the brake discs. The piston 24 terminates in an annular pressure pad 27 which engages the first stationary brake disc 19 and presses all the discs against the brake member 3.

To provide against cupping or other distortion of the discs during use due to heating thereof, each disc 9 is formed with radial slots 30 extending to the inner periphery thereof and each disc 19 is formed with inwardly extending slots 31 and outwardly extending slots 32.

Brakes of this type, especially where used for absorbing a large amount of energy in a short period of application, as where the brake is employed to bring an airplane to a stop from a landing at high speed, convert mechanical energy to heat at a high rate, as pointed out in U.S. Patent 2,850,118, issued September 2, 1958, on an application by me, and assigned to The Goodyear Tire and Rubber Company.

In accordance with one aspect of the present invention each rotatable plate 9 is first covered at 40, 41 with a sintered and bonded layer of powders predominately metallic later black oxide treated as hereafter described. As previously explained it is within the invention to provide the stationary plates with such layers or coatings in which case the rotatable discs may or may not be coated. Also, it would be within the invention to provide a sintered black oxide finished layer on only one face of each of the rotary and stationary discs arranging them so that a facing on one disc co-operates with an adjoining disc surface free from sintered material.

The sintered facings are produced by pressing or briquetting powders of suitable composition comprising metals predominately and containing minor amounts of non-metallic ingredients such as graphite.

Good results have been obtained using a mix which is:

| | Percent by weight |
|---|---|
| Iron powder | 70 |
| Graphite | 20 |
| A hard grit such as silicon carbide | 10 |

While the graphite, perhaps for lubricating properties, and the grit, perhaps as a friction and cleansing agent, are found useful for aircraft brake applications it is not believed that the presence of these materials otherwise has anything to do with the formation of the black oxide coating hereafter described.

A briquette or compact is formed of the original powder materials, and is heated to a sintering temperature, but because the metal powder, even when sintered, is rather porous and of low tensile strength, it is customary to provide a reinforcing backing of solid metal such as steel. When, as in the illustrated embodiment, friction material is pressed on both sides of a "backing" it is conventional to refer to the solid metal as the "core." The heat of the sintering step may be used to integrally bond the material to the backing or core material.

It is usually most economic to process many such articles superposed in stacks in a furnace wherein heat as well as pressure is applied but only after a separator material such as graphite or graphite coated plates are used to prevent sticking of faces not be permanently bonded. In such case, or in any case where shipping or considerable time or preparation therefor (as by oil impregnating) intervenes, the sintered material faced discs are not "clean" in which case as a next step I prefer to fully clean them as to graphite, oil, grease, rust and/or scale, and for this an alkaline, degreasing or trichloroethylene vapor, heated solution may be used, followed by a flash pickle in room temperature muriatic acid, followed by a hot water rinse in 180–212° F. water, followed by a cold rinse in line temperature water.

Thereafter the friction faced discs are immersed in a black oxide producing solution such as for twenty minutes. Black oxide producing solutions are known but heretofore most generally used for producing decorative coatings. Such solutions may be alkaline baths but generally an alkaline salt solution is used. Materials for making the solutions are available in partly prepared form on the open market and one suitable brand is sold to the trade as "Black Magic" a trade name of the Mitchell-Bradford Chemical Company, Wampus Lane, Milford, Connecticut and I have obtained good results by immersing the sintered material faced discs in a treating fluid made up of eight pounds of "Black Magic" per gallon of water with the solution boiling at 296°±10° F. and held at temperature during the twenty minutes the discs are immersed. While I do not know the exact composition of "Black Magic" as made and sold by The Mitchell-Bradford Chemical Company, the material is believed to contain sodium hydroxide, potassium nitrate, sodium nitrate and sodium nitrite.

As one specific example, at least if the friction mix is predominately iron, block oxide producing salts sold by The Mitchell-Bradford Chemical Company, under the trademark Block Magic Type A (generally used as blackening salts for steel) may be used as blackening salts for such friction material and it includes alkali metal hydroxides, alkali metal nitrites, alkali metal nitrates.

Friction mixes, at least if they have a minimum of 60% of oxidizable metal powder useful to cause a chemical reaction during this "black oxide" treatment end up with what I have invented or discovered is a resultant surface which reduces the coefficient of friction at low speed when the brakes are cool (as is especially useful in airplane taxiing in order to keep the brakes from being too sensitive or grabby at this time) without affecting the coefficient of friction at high speed.

Since some salt from the black oxide solution usually remains on the discs, the oxide causing dip can be followed by a cold water rinse in line temperature water, followed by a hot water rinse in 180° to 210° F. water, followed by immersion in chromic acid for two minutes, and then by air drying of the discs, which air drying can be facilitated by using clean compressed air, and then the discs may be covered with a thin coat of water displacing oil.

Figure 6:
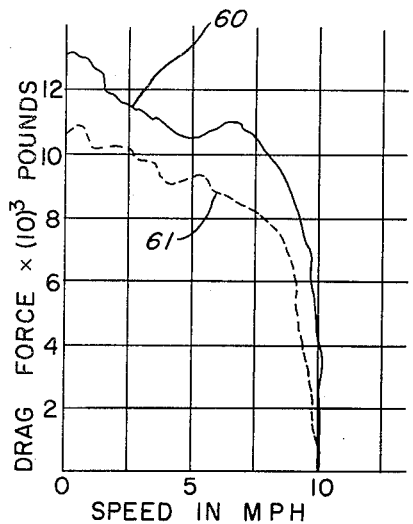
FIG. 6 is a graph showing test data as actually obtained by a stop from ten miles per hour and where the data is plotted as drag force vs. speed.
Figure 7:
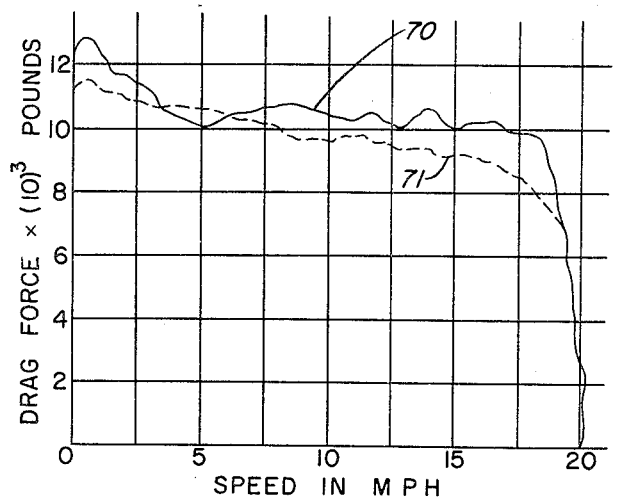
FIG. 7 is a graph showing test data as actually obtained by a stop from twenty miles per hour and where the data is plotted as drag force vs. speed.

Such black oxide coated discs have been found to operate without undue low speed sensitivity or grab, as is apparent from consideration of the accompanying FIGS. 6 and 7.

In FIGS. 6 and 7 the ordinates represent torque or drag force (the numbers shown being × 1,000 pounds), and the abscissae are speed in miles per hour for a low speed stop from 10 miles per hour in FIG. 6 and from 20 miles per hour in FIG. 7. The solid curves 60, 70 represent base line data for a particular brake with non-treated discs for which only 1000 p.s.i. brake line pressure could be used (without exceeding the drag force values shown on the graphs), while the dashed curves 61, 71 show the effect of using black oxided discs in a brake otherwise the same permitting 1300 p.s.i. brake line pressure without materially exceeding the drag force values established for the base line curves with only 1000 p.s.i. brake line pressure.

The words "coated" and "coating" as used herein describe the effect or result of the black oxide treatment which is not only upon but within the pores of the friction material layer.

I have found it impossible to analyze the black oxide coating of friction discs faced according to the present invention because the film (per particle) is so thin that sample scrapings always include some iron, but the coating is probably one of ferrous oxide (FeO) or ferriferrous ($Fe_3O_4$) or a combination of these with each other or one or more of them with $Fe_2O_3$.

I am not sure of just why the articles and processes of the invention give the results that they do. Of course just leaving iron, or a sintered article predominantly iron, out in the rain or subjecting it to steam or merely to the moisture in the air will form iron oxide but this is a non-adherent red iron oxide ($Fe_2O_3$), and the temperature of one high energy aircraft stop will form iron oxide but it is a hard scale which is deleterious to operation, whereas the black oxide coating according to the present invention is far more advantageous because it possibly is soft, because it has penetrated far beneath the surface, and is stable, and because it cushions each engagement. At any rate it reduces the low speed coefficient of friction without materially affecting the coefficient of friction and other requisite properties for high energy stops at high speeds.

While I have described and illustrated a particular embodiment, various modifications may obviously be made without departing from the true spirit and scope of the invention which is intended to be defined by the appended claims and their reasonable equivalents.

I claim:

1. A brake having rotatable and nonrotatable co-operating brake elements, one of said elements comprising a body of steel having a friction material layer of sintered composition including iron and mounted directly on said body and fused thereto, a black oxide coating upon and within the friction material layer, the other of said co-operating brake elements being of steel and positioned for frictional engagement with the black oxide coated friction material layer.

2. An assembly having co-operating elements which are capable of engagement and disengagement and which are relatively rotatable when disengaged, one of said elements having a friction material layer of sintered composition comprising iron and graphite and a black oxide coating upon and at least partially within the friction material layer, the other of said co-operating elements being of metal and positioned for frictional engagement with said friction material layer.

References Cited in the file of this patent

UNITED STATES PATENTS

| | | |
|---|---|---|
| 1,956,462 | Knuth | Apr. 24, 1934 |
| 2,187,589 | Lenel | Jan. 16, 1940 |
| 2,271,375 | MacKay | Jan. 27, 1942 |
| 2,418,719 | Mann | Apr. 8, 1947 |
| 2,476,151 | Jeune | July 12, 1949 |
| 2,542,994 | Cobb | Feb. 27, 1951 |
| 2,804,947 | Wellman | Sept. 3, 1957 |

FOREIGN PATENTS

| | | |
|---|---|---|
| 213,108 | Australia | Feb. 29, 1956 |